(12) United States Patent
Mori et al.

(10) Patent No.: US 8,582,024 B2
(45) Date of Patent: Nov. 12, 2013

(54) DOME CAMERA

(75) Inventors: Akitoshi Mori, Kanagawa (JP); Jyouji Wada, Kanagawa (JP)

(73) Assignee: Panasonic Corporation, Osaka (JP)

( * ) Notice: Subject to any disclaimer, the term of this patent is extended or adjusted under 35 U.S.C. 154(b) by 427 days.

(21) Appl. No.: 12/994,363

(22) PCT Filed: Sep. 9, 2009

(86) PCT No.: PCT/JP2009/004449
§ 371 (c)(1),
(2), (4) Date: Nov. 23, 2010

(87) PCT Pub. No.: WO2010/029727
PCT Pub. Date: Mar. 18, 2010

(65) Prior Publication Data
US 2011/0096164 A1 Apr. 28, 2011

(30) Foreign Application Priority Data
Sep. 9, 2008 (JP) ................................. 2008-231295

(51) Int. Cl.
*H04N 5/225* (2006.01)
(52) U.S. Cl.
USPC .......................................................... 348/373
(58) Field of Classification Search
USPC .......................................................... 348/373
See application file for complete search history.

(56) References Cited

U.S. PATENT DOCUMENTS 3,780,224 A * 12/1973 Levine ............................ 348/38
7,697,210 B2    4/2010 Lang
2007/0292121 A1 * 12/2007 Sato .............................. 396/144
2009/0303325 A1   12/2009 Mizuno
2010/0158503 A1 *  6/2010 Fujiwara ...................... 396/448

FOREIGN PATENT DOCUMENTS

| CN | 101089720 | 12/2007 |
| JP | 64-076040 | 3/1989 |
| JP | 7-199019  | 8/1995 |
| JP | 9-138456  | 5/1997 |

(Continued)

OTHER PUBLICATIONS

English translation of JP 2002-258133 Yanagisawa Sep. 2002.*

(Continued)

*Primary Examiner* — James Hannett
(74) *Attorney, Agent, or Firm* — Dickinson Wright PLLC

(57) ABSTRACT

A dome camera (1) includes a lens unit (5) having an adjustable lens focal point, a dome cover (4) for covering the lens unit (5), and a pseudo-cover (7) having optically equivalent characteristics to those of the dome cover (4). The pseudo-cover (7) is capable of rotating around a rotation axis which is set at the lens unit (5) from a lens focal point adjusting position which is set on an optical axis of the lens unit (5) toward a retraction position which is back from the optical axis of the lens unit (5). At the time of lens focal point adjustment work, the lens focal point is adjusted while the pseudo-cover (7) is set at the lens focal point adjusting position. When the lens focal point adjustment work ends, the pseudo-cover (7) is rotated to the retraction position to retract from the optical axis of the lens unit (5), and the dome cover (4) is put over the lens unit (5). Thus, there is provided a dome camera capable of improving the workability of the lens focal point adjustment work with a simple and inexpensive configuration.

8 Claims, 11 Drawing Sheets

(56) References Cited

FOREIGN PATENT DOCUMENTS

| | | | |
|---|---|---|---|
| JP | 2000-314832 | | 11/2000 |
| JP | 2002-258133 | * | 9/2002 |
| JP | 2004-226744 | | 8/2004 |
| JP | 2004-320526 | | 11/2004 |
| JP | 2005-195624 | | 7/2005 |
| JP | 2007-006397 | | 1/2007 |
| JP | 2007-334116 | | 12/2007 |
| JP | 2008-017258 | | 1/2008 |
| JP | 2008-122922 | | 5/2008 |

OTHER PUBLICATIONS

International Search Report dated Dec. 15, 2009.
Extended European Search Report dated Sep. 5, 2011.
Chinese Office Action dated Feb. 22, 2012.
Japanese Office Action dated May 15, 2012.

* cited by examiner (a)

(b)

DOME CAMERA

TECHNICAL FIELD

The present invention relates to a dome camera including a dome cover and, more particularly, to a technique for improving the workability of the work of adjusting a lens focal point.

BACKGROUND ART

A dome camera including a dome cover is conventionally used as a camera for monitoring in a facility or a building. Such a dome camera is protected from the outside by being covered with a dome cover.

With the need for lower cost, simplified lenses (e.g., a varifocal lens) with a function of adjusting a lens focal point by manual operation have recently been used as lenses for dome cameras. The work of adjusting a lens focal point of a varifocal lens is performed by a user (operator) manually operating a lever for focal point adjustment with a dome cover removed at the time of the work of installing a dome camera. When the work of adjusting the lens focal point of the varifocal lens ends, the user puts the dome cover over the camera.

However, even if a lens focal point of a lens has been appropriately adjusted by lens focal point adjustment work in a conventional dome camera, when the lens is covered with a dome cover, a lens focal point shift occurs due to the lens effect of the dome cover itself (see FIG. 11) to cause blurring in camera footage. A user thus needs to rely on his/her own experience to perform lens focal point adjustment work while taking into account a lens focal point shift. The lens focal point adjustment work involves a process of try and error, such as adjusting a lens focal point and, if blurring is found when the lens is covered with the dome lens, finely adjusting the focal point again.

For this reason, there has conventionally been proposed an imaging apparatus including a lens correction table for correcting for a lens focal point shift as described above (e.g., Patent Literature 1). In the conventional imaging apparatus, a user performs a button operation with a dome cover removed, thereby driving a motor for focal point adjustment to adjust a lens focal point. When the dome cover is put after the lens focal point adjustment, the lens focal point is finely adjusted with reference to the lens correction table. The fine adjustment is performed by driving of the motor for focal point adjustment. A conventional imaging apparatus as described above requires (expensive) components such as memory for storing a table, a motor for focal point adjustment, and a unit for controlling the components and runs counter to the need for lower cost. In addition, not only the focal distance and magnification of a lens but also the type of the lens and the distance to an object need to be taken into account as parameters of a lens correction table in order to appropriately correct for a lens focal point shift using the table. If the lens correction table contains such various parameters, the amount of data in the lens correction table becomes enormous. This results in the need for mass memory (expensive memory) as memory for storing the lens correction table and the difficulty in achieving lower cost.

CITATION LIST

Patent Literature

Patent Literature 1: Japanese Patent Laid-Open No. 2007-6397

SUMMARY OF INVENTION

Technical Problem

The present invention has been made against the above-described background. An object of the present invention is to provide a dome camera capable of improving the workability of the work of adjusting a lens focal point with a simple and inexpensive configuration.

Solution to Problem

One aspect of the present invention is a dome camera. The dome camera comprises a lens unit having an adjustable lens focal point, a dome cover for covering the lens unit, and a pseudo-cover having optically equivalent characteristics to characteristics of the dome cover. The pseudo-cover is capable of rotating from a lens focal point adjusting position which is set on an optical axis of the lens unit toward a retraction position which is back from the optical axis of the lens unit.

As will be described below, the present invention encompasses other aspects. Therefore, the disclosure of the invention is intended to introduce some aspects of the present invention and is not intended to limit the scope of the invention claimed and described herein.

DESCRIPTION OF EMBODIMENTS

Figure 1:
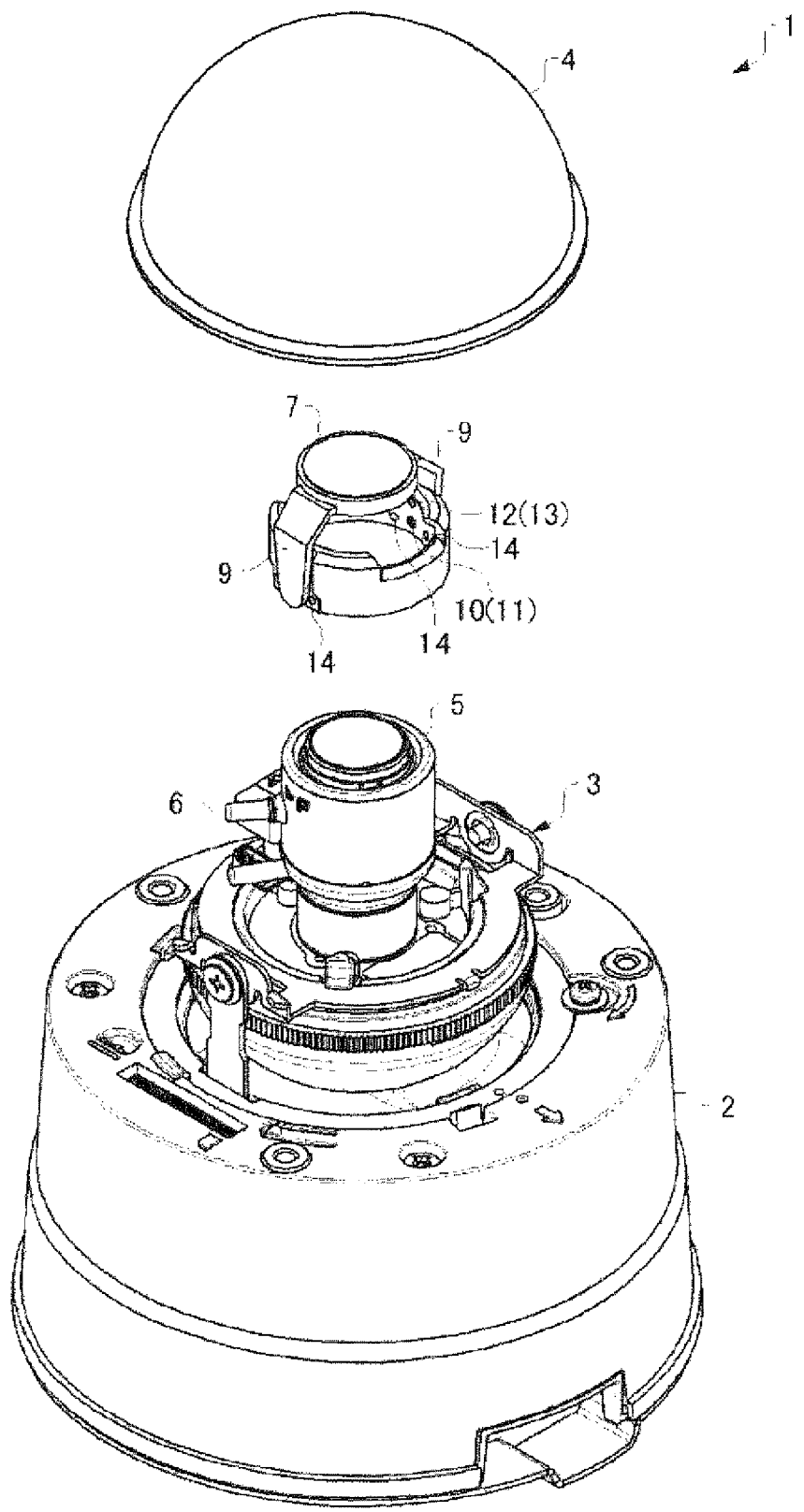
FIG. 1 is an exploded perspective view showing a main configuration of a dome camera according to an embodiment of the present invention.

The present invention will be described in detail below. However, the detailed description below and the accompanying drawings are not intended to limit the invention. The scope of the invention is defined by the appended claims.

A dome camera according to the present invention includes a lens unit having an adjustable lens focal point, a dome cover for covering the lens unit, and a pseudo-cover having optically equivalent characteristics to characteristics of the dome cover. The pseudo-cover is configured to be capable of rotating from a lens focal point adjusting position which is set on an optical axis of the lens unit toward a retraction position which is back from the optical axis of the lens unit.

With this configuration, at the time of lens focal point adjustment work, the lens focal point is adjusted while the pseudo-cover is set at the lens focal point adjusting position (on the optical axis of the lens unit). When the lens focal point adjustment work ends, the pseudo-cover is rotated to the retraction position to retract from the optical axis of the lens unit. Since the pseudo-cover has the optically equivalent characteristics to those of the dome cover, conventional fine adjustment that takes into account a lens focal point shift need not be performed after the dome cover is put as long as the lens focal point has been appropriately adjusted by the lens focal point adjustment work using the pseudo-cover. This facilitates lens focal point adjustment work at a site where the dome camera is to be installed. In addition, the pseudo-cover has a simpler and more inexpensive configuration than conventional components (e.g., memory for storing a table, a motor for focal point adjustment, and a unit for controlling the components) and can meet the need for lower cost.

The dome camera according to the present invention may be configured such that the pseudo-cover is attached to a distal end of the lens unit around a rotation axis which is set at the lens unit and such that the rotation axis is set at a position which is offset from a center of the dome cover toward the distal end of the lens unit.

With this configuration, the pseudo-cover is capable of rotating in a space-saving manner at the distal end of the lens unit about the rotation axis which is offset toward the distal end of the lens unit. A radius of rotation of the pseudo-cover decreases with an increase in the offset of the rotation axis toward the distal end of the lens unit. This allows the pseudo-cover to be housed in a limited space inside the dome cover in a space-saving manner. Accordingly, for example, the pseudo-cover can be stored in the dome cover.

The dome camera according to the present invention may be configured such that the pseudo-cover at the lens focal point adjusting position is located at the same position as a position where the dome cover is to be located or outside the position where the dome cover is to be located.

With this configuration, if an erroneous attempt is made to put the dome cover while the pseudo-cover is kept at the lens focal point adjusting position, the pseudo-cover and the dome cover interfere with each other. The dome cover can thus be prevented from being erroneously put without rotating the pseudo-cover to the retraction position (while the pseudo-cover is kept at the lens focal point adjusting position).

The dome camera according to the present invention may be configured such that the pseudo-cover at the lens focal point adjusting position is located inside a position where the dome cover is to be located, and the pseudo-cover has a thickness set to be smaller than a thickness of the dome cover and a radius of curvature set to be smaller than a radius of curvature of the dome cover.

With this configuration, the pseudo-cover can be designed to be more compact while the optical characteristics of the pseudo-cover (optically equivalent characteristics to those of the dome cover) are maintained.

The dome camera according to the present invention may be configured such that the lens unit has a shaft hole formed at a position of the rotation axis and such that the pseudo-cover includes a shaft pin which is inserted into the shaft hole and is rotatably supported on the lens unit via the shaft hole.

With this configuration, the pseudo-cover can be supported on the lens unit such that the pseudo-cover can be rotated from the lens focal point adjusting position toward the retraction position about the shaft hole of the lens unit (the rotation axis). Note that the shaft hole may be directly formed in the lens unit or may be provided by attaching another member with the shaft hole to the lens unit.

The dome camera according to the present invention may be configured such that a lock pin is provided at one of the pseudo-cover and the lens unit and such that an adjusting position lock hole with which the lock pin engages when the pseudo-cover is set at the lens focal point adjusting position and a retraction position lock hole with which the lock pin engages when the pseudo-cover is set at the retraction position are formed in the other of the pseudo-cover and the lens unit.

With this configuration, when the pseudo-cover is set at the lens focal point adjusting position, the lock pin engages with the adjusting position lock hole to position the pseudo-cover. On the other hand, when the pseudo-cover is set at the retraction position, the lock pin engages with the retraction position lock hole to position the pseudo-cover. This facilitates positioning of the pseudo-cover at the lens focal point adjusting position and the retraction position and improves the workability of lens focal point adjustment work.

The dome camera according to the present invention may be configured such that the lens unit is provided at a camera unit which is tilt-rotatable, such that the rotation axis is set on the optical axis of the lens unit, and such that the retraction position is set at each of a position at which the pseudo-cover is located after the pseudo-cover is rotated from the optical axis of the lens unit toward one side along a tilt rotation direction of the camera unit and a position at which the pseudo-cover is located after the pseudo-cover is rotated from the optical axis of the lens unit toward the other side.

With this configuration, if the camera unit is tilt-rotated to one side in the work of installing the dome camera, the pseudo-cover is rotated to the retraction position in a direction opposite to the direction in which the camera unit is tilt-rotated, after lens focal point adjustment work. This prevents the pseudo-cover from contacting (interfering with) another component when the camera unit is tilt-rotated and allows space-saving storage.

The dome camera according to the present invention may be configured such that the lens unit is provided at a camera unit which is tilt-rotatable, such that the rotation axis is set at a position which is offset from the optical axis of the lens unit toward one side on a tilt rotation plane of the camera unit, and such that the retraction position is set at a position where the pseudo-cover is located after the pseudo-cover is rotated from the optical axis of the lens unit toward a side opposite to the one side along a tilt rotation direction of the camera unit.

With this configuration, a radius of rotation of the pseudo-cover can be increased with an increase in an offset of the rotation axis from the optical axis of the lens unit, and the pseudo-cover at the retraction position can be housed in a space-saving manner. Accordingly, even if the pseudo-cover needs to be designed to have a large radius of rotation, for example, such that the lens focal point adjusting position of the pseudo-cover is set at the same position as a position where the dome cover is to be located, the pseudo-cover rotated to the retraction position can be housed in a space-saving manner.

The present invention is provided with a pseudo-cover capable of rotating from the lens focal point adjusting position to the retraction position. This allows an improvement in the workability of lens focal point adjustment work with a simple and inexpensive configuration.

A dome camera according to an embodiment of the present invention will be described below with reference to the drawings. This embodiment illustrates a dome camera used as a security camera installed on a wall or ceiling of a facility or building, or the like.

Figure 2:
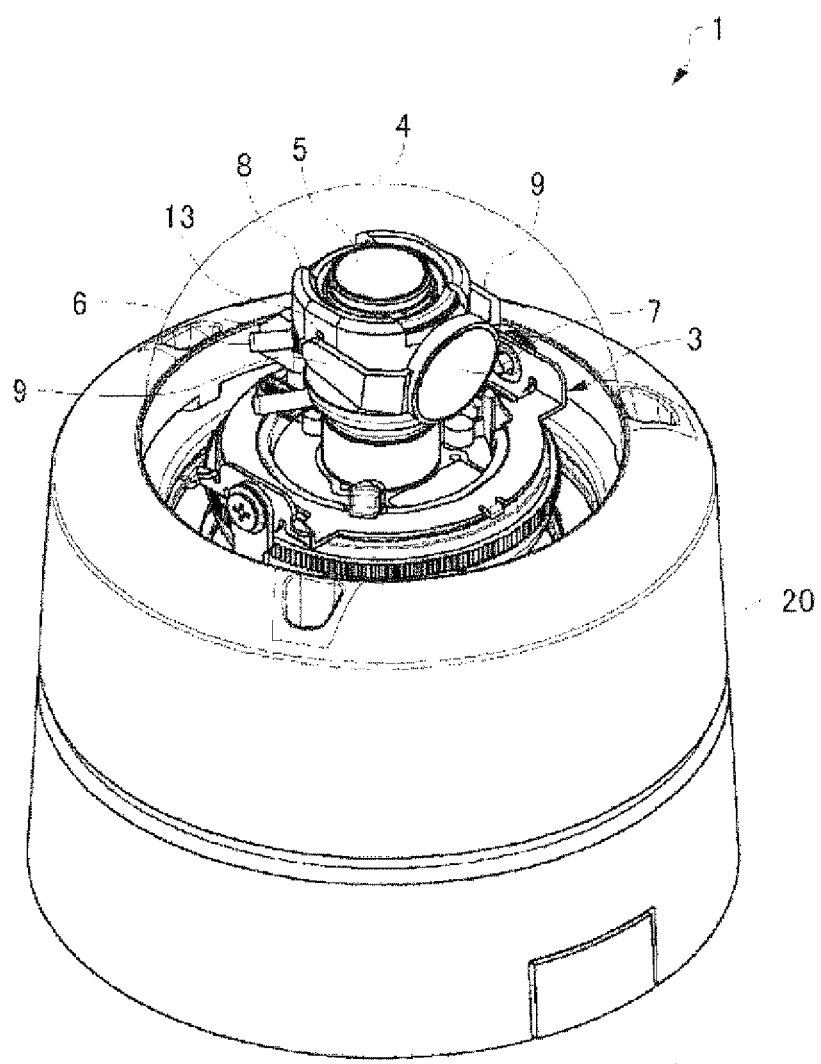
FIG. 2 is a perspective view showing the whole of the dome camera according to the embodiment.

The configuration of the dome camera according to this embodiment will be described with reference to FIGS. 1 and 2. FIG. 1 is an exploded perspective view showing a main configuration of the dome camera, and FIG. 2 is a perspective view showing the whole of the dome camera. As shown in FIGS. 1 and 2, a dome camera 1 includes a base unit 2 which is attached to a wall or a ceiling, a camera unit 3 which is attached to the base unit 2 to be tilt-rotatable and pan-rotatable, and a dome cover 4 for covering the camera unit 3. Although not shown in FIG. 1, a top cover 20 is put on the base unit 2 (see FIG. 2). The dome camera 1 is totally protected by the dome cover 4 and the top cover 20.

The camera unit 3 includes a lens unit 5 having an adjustable lens focal point. The lens unit 5 in this embodiment is a varifocal lens whose lens focal point is adjusted by manual operation of a lever 6 for focal point adjustment. As shown in FIG. 2, a pseudo-cover 7 is rotatably attached to a distal end of the lens unit 5 via a retaining ring 8. As will be described later, the pseudo-cover 7 is rotatable from a lens focal point adjusting position (see FIGS. 3 and 4) which is set on an optical axis of the lens unit 5 toward a retraction position (see FIGS. 5 and 6) which is back from the optical axis of the lens unit 5. In this embodiment, the pseudo-cover 7 at the lens focal point adjusting position is located at the same position as a position where the dome cover 4 is to be located (see FIG. 4). Retraction positions are set at positions on both sides, respectively, of the optical axis of the lens unit 5 where the pseudo-cover 7 is located after being rotated by about 90° from the optical axis along a tilt rotation direction of the camera unit 3 (see FIG. 7).

The pseudo-cover 7 has optically equivalent characteristics to those of the dome cover 4. As described above, the pseudo-cover 7 at the lens focal point adjusting position is located at the same position as a position where the dome cover 4 is to be located. Accordingly, the pseudo-cover 7 is prepared using the same material as that for the dome cover 4 and is designed to have the same thickness and the same radius of curvature as those of the dome cover 4. The pseudo-cover 7 may have a different thickness and a different radius of curvature or may be made of a different material as long as the pseudo-cover 7 has the optically equivalent characteristics to those of the dome cover.

Figure 4:
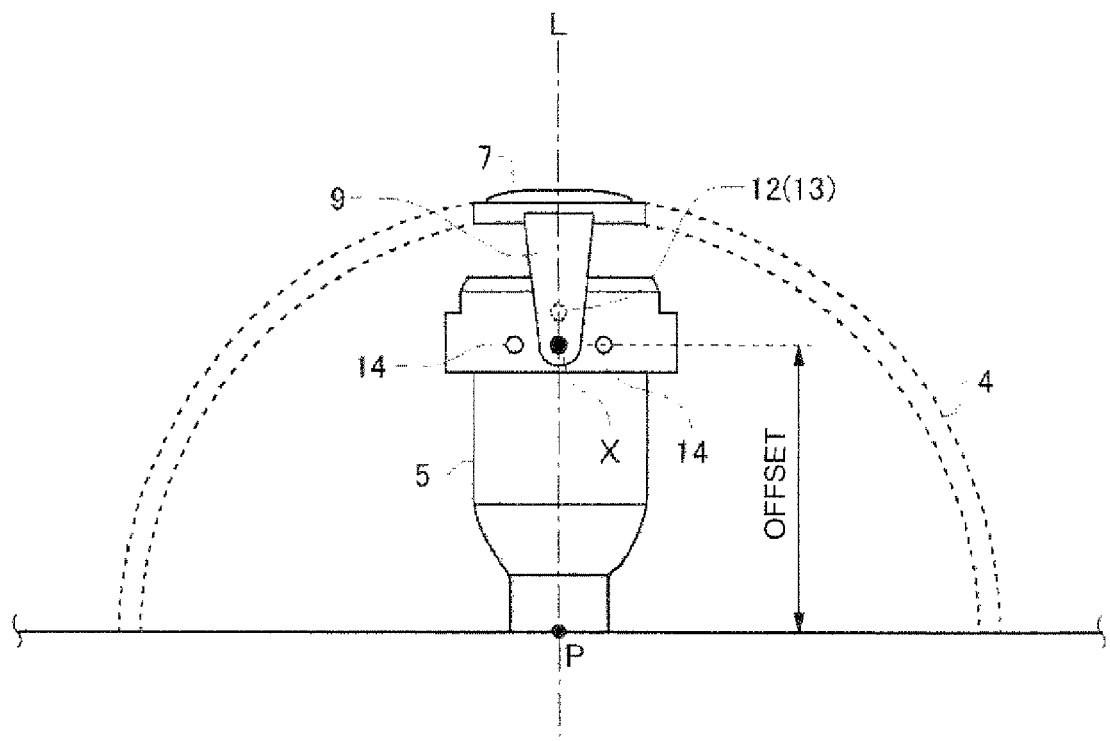
FIG. 4 is a view for explaining the state where the pseudo-cover is set at the lens focal point adjusting position, as seen from a side.

A pair of support pieces 9 is provided at two ends of the pseudo-cover 7 to extend downward (toward the lower side in FIG. 1). Shaft pins 10 are provided to protrude inwardly at inner surfaces of distal ends of the pair of support pieces 9, respectively. A pair of shaft holes 11 is formed in an outer surface of the retaining ring 8. The pseudo-cover 7 is rotatably supported on the retaining ring 8 by the shaft pins 10 being inserted into the shaft holes 11. When the retaining ring 8 with the pseudo-cover 7 rotatably attached thereto is attached to the lens unit 5, the pseudo-cover 7 is rotatably attached to the lens unit 5. That is, the attachment of the retaining ring 8 to the lens unit 5 allows each shaft hole 11 to be described as being formed in the lens unit 5. The pseudo-cover 7 rotates about the positions of the shaft holes 11, and a rotation axis of the pseudo-cover 7 is located where the shaft holes 11 are located. Accordingly, the attachment of the retaining ring 8 to the lens unit 5 allows the rotation axis to be described as being set at the lens unit 5. As shown in FIG. 4, an axis X of rotation (the shaft holes 11) is set at a position offset from a center P of the dome cover 4 toward the distal end of the lens unit 5 (the upper side in FIG. 4) on an optical axis L of the lens unit 5.

Lock pins 12 are provided to protrude inwardly at positions closer to proximal ends of the pair of support pieces 9 than the shaft pins 10 (the upper side in FIG. 1) of the inner surfaces of the pair of support pieces 9, respectively. At the outer surface of the retaining ring 8, an adjusting position lock hole 13 with which the corresponding lock pin 12 engages when the pseudo-cover 7 is at the lens focal point adjusting position is formed at a position above the shaft hole 11 (the upper side in FIG. 1), and two retraction position lock holes 14, with one of which the lock pin 12 engages when the pseudo-cover 7 is at the corresponding retraction position, are formed at positions on both sides of the shaft hole 11 (the left and right sides in FIG. 1).

The operation of the dome camera 1 with the above-described configuration will be described with reference to FIGS. 3 to 7.

Figure 3:
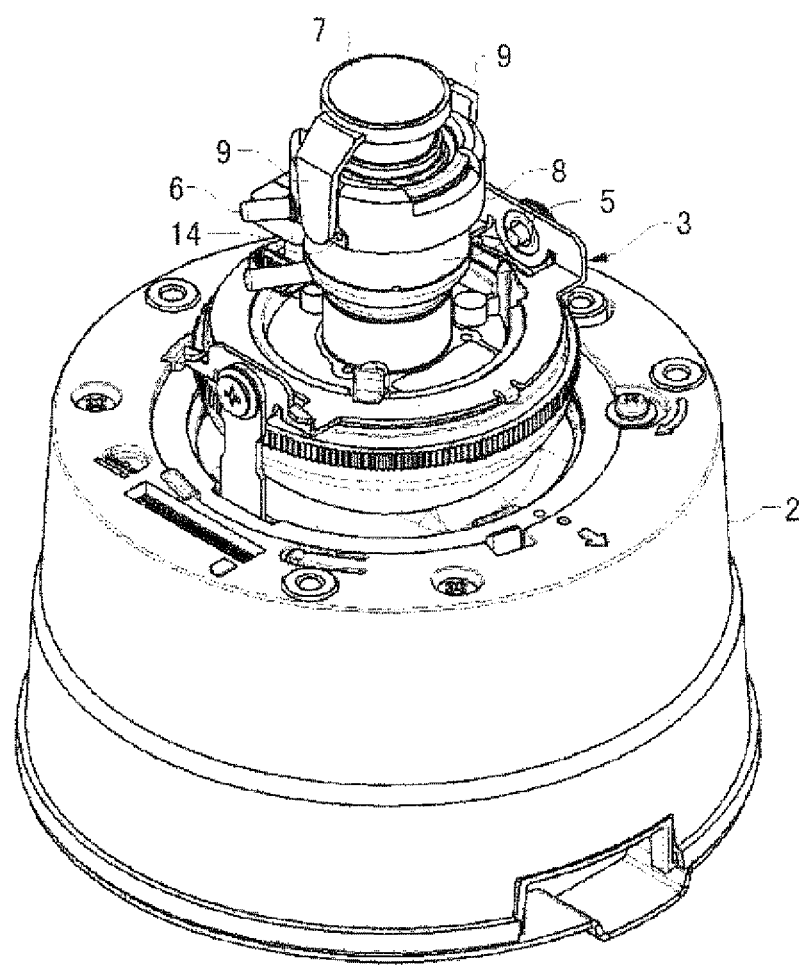
FIG. 3 is a perspective view of a state where a pseudo-cover is set at a lens focal point adjusting position.

At the time of the work of installing the dome camera 1 according to this embodiment, a user first performs lens focal point adjustment work with the dome cover 4 removed. At this time, the user performs the work of focusing the lens unit 5 by manually operating the lever 6 for focal point adjustment while the pseudo-cover 7 is set at the lens focal point adjusting position, as shown in FIGS. 3 and 4. The focusing work can be performed, for example, on the basis of guidance for work, such as display of a focused point (not shown), provided by the camera.

Figure 5:
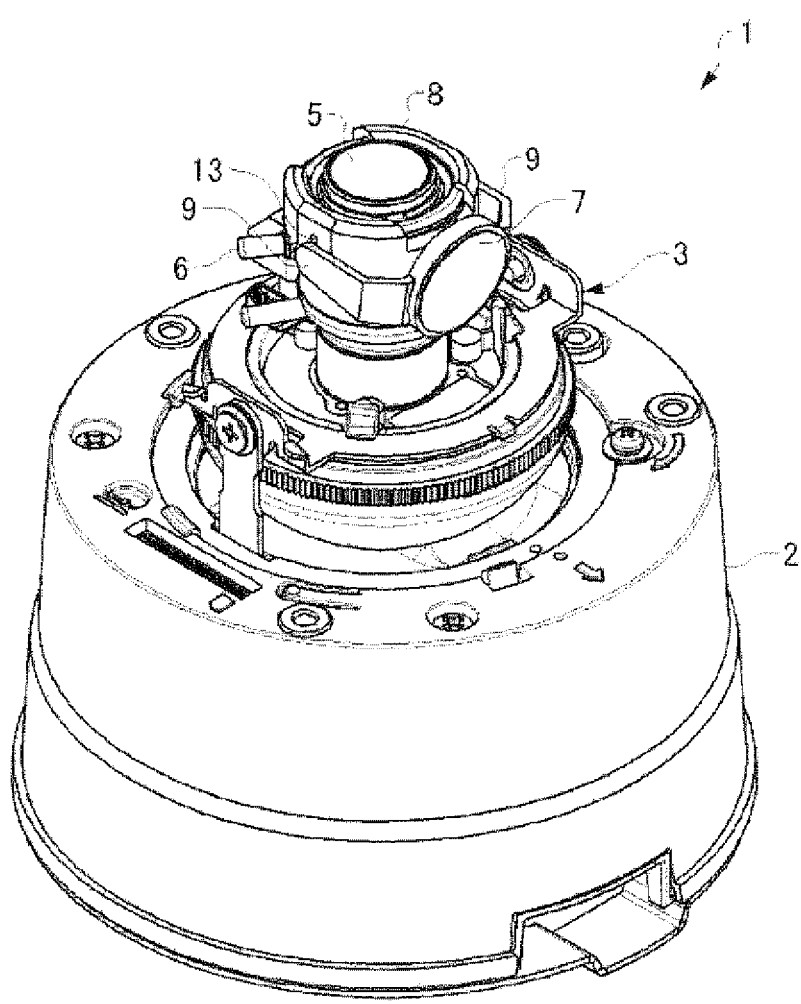
FIG. 5 is a perspective view of a state where the pseudo-cover is set at a retraction position.
Figure 6:
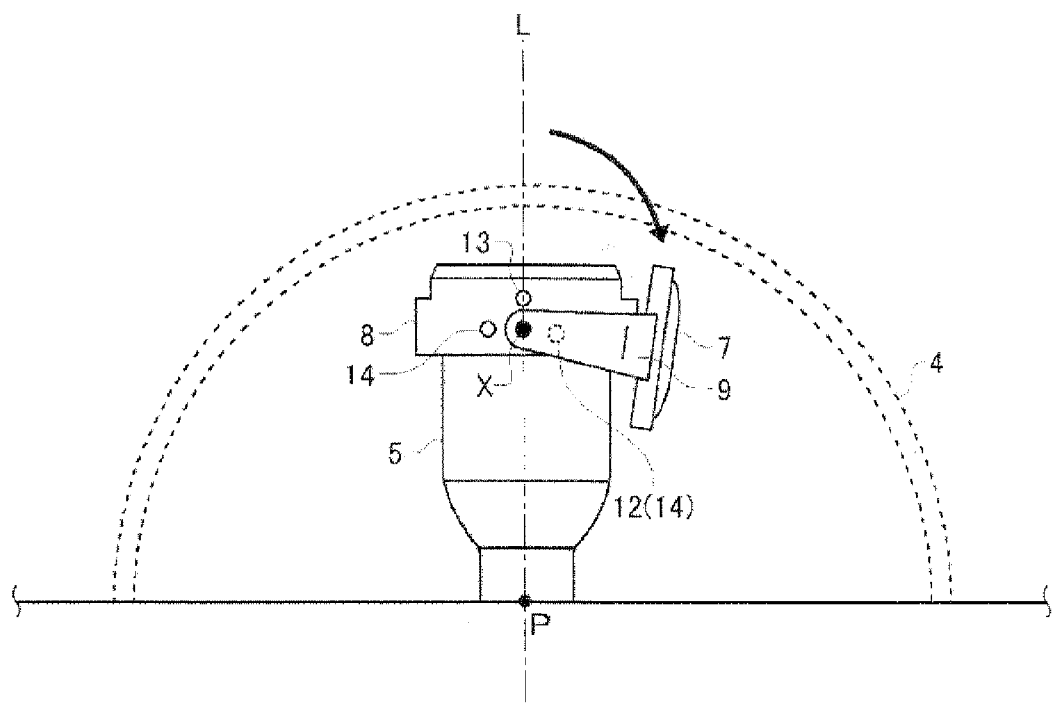
FIG. 6 is a view for explaining the state where the pseudo-cover is set at the retraction position, as seen from the side.
Figure 7:
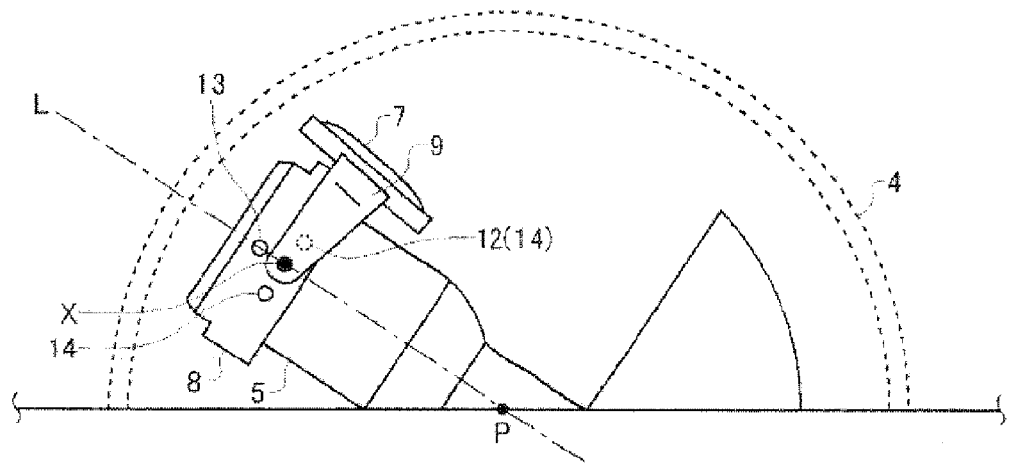
FIGS. 7(a) and 7(b) are views for explaining how a camera unit is tilted.
Figure 7:
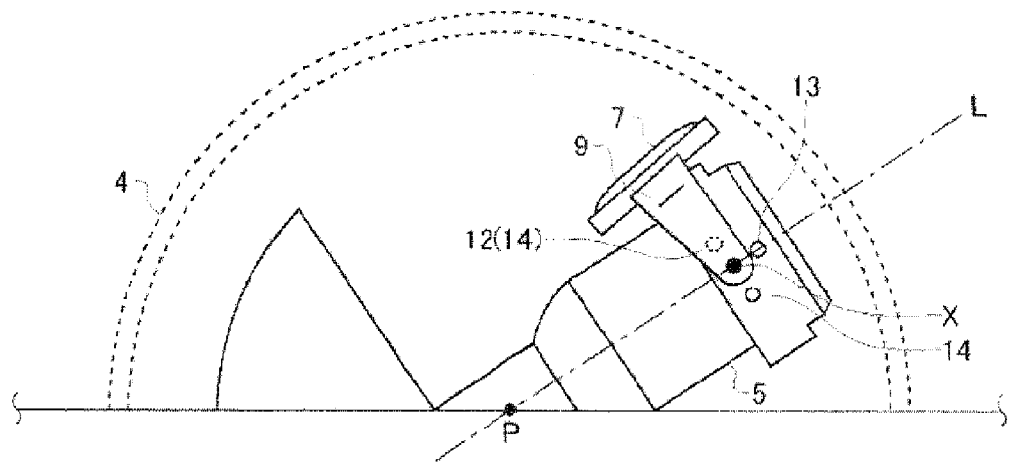

When the lens focal point adjustment work ends, the user rotates the pseudo-cover 7 to one of the retraction positions, as shown in FIGS. 5 and 6, and puts the dome cover 4 over the camera unit 3. Note that if a shooting direction of the camera is adjusted by tilt-rotating the camera unit 3, the pseudo-cover 7 is rotated to the retraction position in a direction opposite to the direction in which the camera unit 3 has been tilt-rotated. For example, when the shooting direction of the camera is adjusted by tilt-rotating the camera unit 3 to one side (the left side in FIGS. 7(a) and 7(b)), as shown in FIG. 7(a), the pseudo-cover 7 is rotated to the retraction position in a direction (the right side in FIGS. 7(a) and 7(b)) opposite to the direction in which the camera unit 3 has been tilt-rotated. On the other hand, when the shooting direction of the camera is adjusted by tilt-rotating the camera unit 3 to the other side (the right side in FIGS. 7(a) and 7(b)), as shown in FIG. 7(b), the pseudo-cover 7 is rotated to the retraction position in a direction (the left side in FIGS. 7(a) and 7(b)) opposite to the direction in which the camera unit 3 has been tilt-rotated.

According to the dome camera 1 of this embodiment, the pseudo-cover 7 rotatable from the lens focal point adjusting position toward each retraction position is provided. This allows an improvement in the workability of lens focal point adjustment work with a simple and inexpensive configuration.

More specifically, in this embodiment, at the time of lens focal point adjustment work, the lens focal point is adjusted while the pseudo-cover 7 is set at the lens focal point adjusting position (on the optical axis of the lens unit 5), as shown in FIGS. 3 and 4. When the lens focal point adjustment work ends, the pseudo-cover 7 is rotated to the retraction position to retract from the optical axis, as shown in FIGS. 5 and 6, such that the pseudo-cover 7 exits the field of view for shooting of the dome camera 1. Since the pseudo-cover 7 has optically equivalent characteristics to those of the dome cover 4, conventional fine adjustment that takes into account a lens focal point shift need not be performed as long as the lens focal point has been appropriately adjusted by the lens focal point adjustment work using the pseudo-cover 7. This facilitates lens focal point adjustment work at a site where the dome camera 1 is to be installed. In addition, the pseudo-cover 7 has a simpler and more inexpensive configuration than conventional components (e.g., memory for storing a table, a motor for focal point adjustment, and a unit for controlling the components) and can meet the need for lower cost.

In this embodiment, the pseudo-cover 7 is capable of rotating in a space-saving manner at the distal end of the lens unit 5 about the rotation axis which is offset toward the distal end of the lens unit 5 (see FIG. 6). A radius of rotation of the pseudo-cover 7 decreases with an increase in the offset of the rotation axis toward the distal end of the lens unit 5. This allows the pseudo-cover 7 to be housed in a limited space inside the dome cover 4 in a space-saving manner. Accordingly, for example, the pseudo-cover 7 can be stored in the dome cover 4.

In this embodiment, if an erroneous attempt is made to put the dome cover 4 while the pseudo-cover 7 is kept at the lens focal point adjusting position, the pseudo-cover 7 and the dome cover 4 interfere with each other (see FIG. 4). The dome cover 4 can thus be prevented from being erroneously put without rotating the pseudo-cover 7 to either retraction position (while the pseudo-cover 7 is kept at the lens focal point adjusting position).

In this embodiment, the pseudo-cover 7 can be supported on the lens unit 5 such that the pseudo-cover 7 can be rotated from the lens focal point adjusting position toward each retraction position about the shaft holes 11 of the lens unit 5 (the rotation axis). Note that the shaft holes 11 may be provided by attaching the retaining ring 8 with the shaft holes 11 to the lens unit 5, as in this embodiment, or may be directly formed in the lens unit 5.

In this embodiment, when the pseudo-cover 7 is set at the lens focal point adjusting position, the lock pins 12 engage with the adjusting position lock holes 13 to position the pseudo-cover 7 (see FIG. 4). When the pseudo-cover 7 is set at one of the retraction positions, each lock pin 12 engages with the corresponding retraction position lock hole 14 to position the pseudo-cover 7 (see FIG. 6). This configuration facilitates positioning of the pseudo-cover 7 at the lens focal point adjusting position and the retraction positions and improves the workability of lens focal point adjustment work.

In this embodiment, if the camera unit 3 is tilt-rotated to one side in the work of installing the dome camera 1, as shown in FIGS. 7(a) and 7(b), the pseudo-cover 7 is rotated to the retraction position in a direction opposite to the direction in which the camera unit 3 is tilt-rotated, after lens focal point adjustment work. This prevents the pseudo-cover 7 from contacting (interfering with) another component when the camera unit 3 is tilt-rotated and allows space-saving storage.

The embodiment of the present invention has been illustrated above. However, the scope of the present invention is not limited to this, and changes and modifications may be made according to the intended use within the scope described in the claims.

Figure 8:
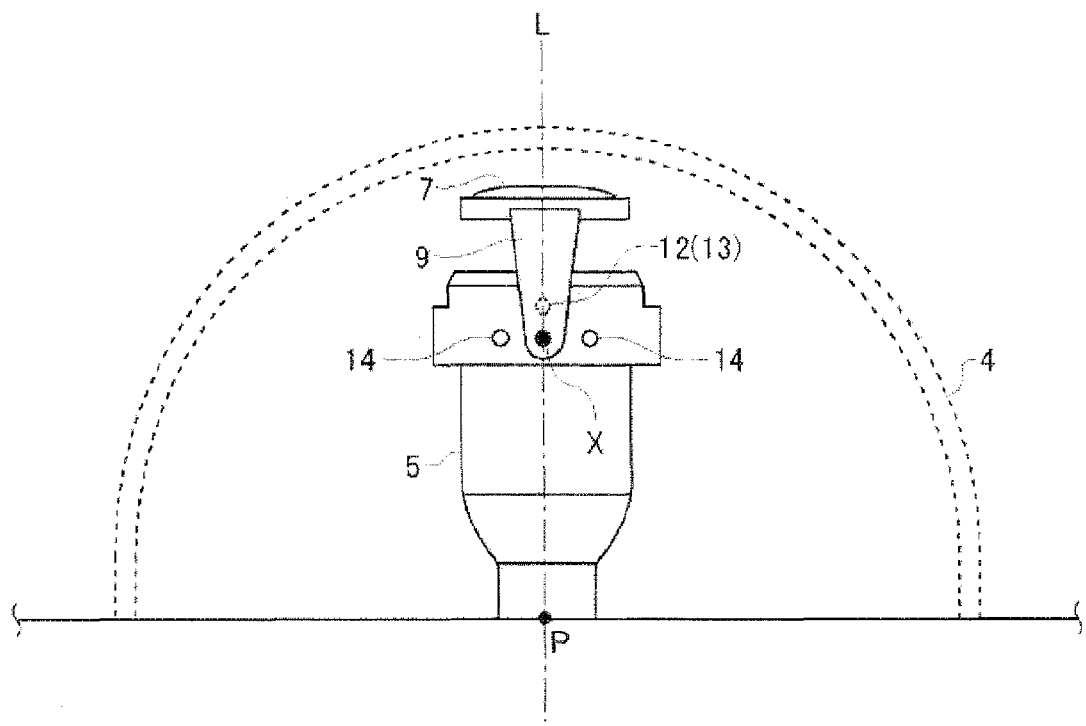
FIG. 8 is a view for explaining a dome camera according to another embodiment.

Although an example in which the pseudo-cover 7 at the lens focal point adjusting position is located at the same position as a position where the dome cover 4 is to be located has been explained in the above description, the scope of the present invention is not limited to this. As shown in FIG. 8, a pseudo-cover 7 may be located inside a position where a dome cover 4 is to be located. In this case, the thickness of the pseudo-cover 7 is set to be smaller than that of the dome cover 4, and the radius of curvature of the pseudo-cover 7 is set to be smaller than that of the dome cover 4. With this configuration, the pseudo-cover 7 can be designed to be more compact while the optical characteristics of the pseudo-cover 7 (optically equivalent characteristics to those of the dome cover 4) are maintained.

Although the example in which the pseudo-cover 7 at a lens focal point adjusting position is located at the same position as the position where the dome cover 4 is to be located has been described in this embodiment, the scope of the present invention is not limited to this. The pseudo-cover 7 may be located outside the position where the dome cover 4 is to be located. In this case as well, if an erroneous attempt is made to put the dome cover while the pseudo-cover is kept at the lens focal point adjusting position, the pseudo-cover and the dome cover interfere with each other. The dome cover can thus be prevented from being erroneously put without rotating the pseudo-cover to either retraction position (while the pseudo-cover is kept at the lens focal point adjusting position).

Figure 9:
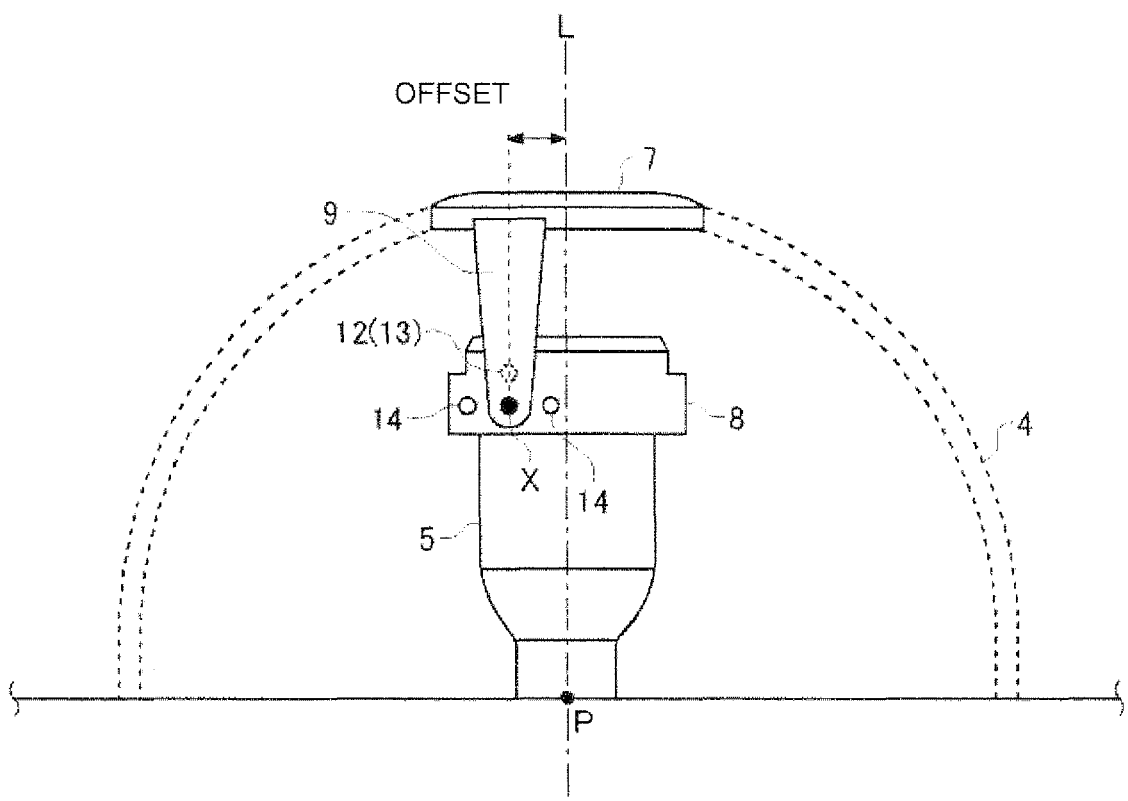
FIG. 9 is a view for explaining a dome camera (in a state where a pseudo-cover is set at a lens focal point adjusting position) according to still another embodiment.
Figure 10:
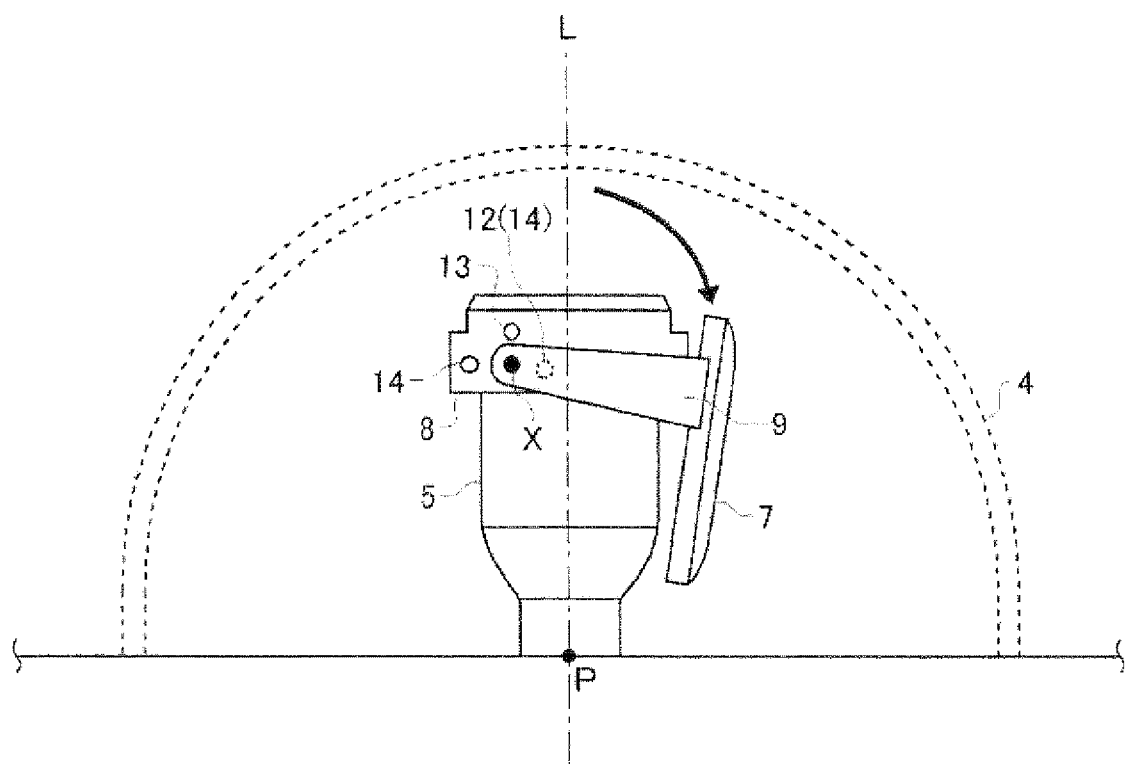
FIG. 10 is a view for explaining the dome camera (in a state where the pseudo-cover is set at a retraction position) according to the still other embodiment.
Figure 11:
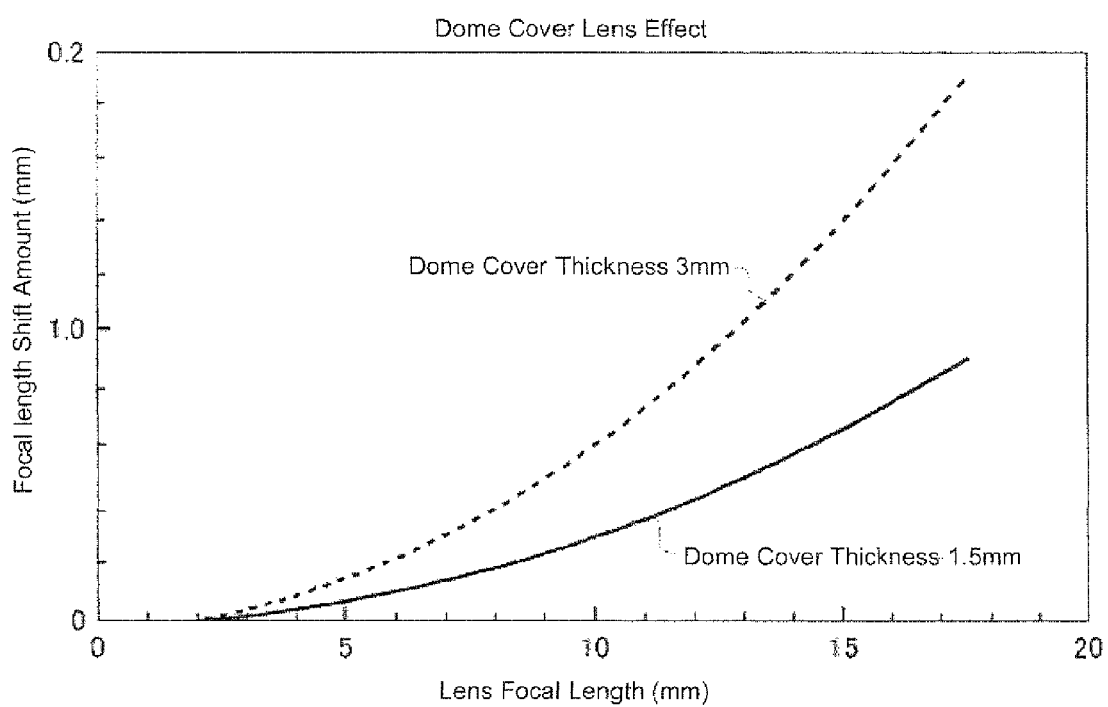
FIG. 11 is a graph showing the lens effect of a dome cover.

Alternatively, as shown in FIG. 9, an axis X of rotation of a pseudo-cover 7 may be set at a position offset from an optical axis L of a lens unit 5 toward one side (the left side in FIG. 9) on a tilt rotation plane of a camera unit 3 (on the sheet surface in FIG. 9). In this case, as shown in FIG. 10, a retraction position of the pseudo-cover 7 is set at a position where the pseudo-cover 7 is located after the pseudo-cover 7 is rotated from the optical axis of the lens unit 5 toward the other side (the right side in FIG. 10) along a tilt rotation direction of the camera unit 3.

For this reason, the radius of rotation of the pseudo-cover 7 can be increased with an increase in the offset of the rotation axis from the optical axis of the lens unit 5, and the pseudo-cover 7 at the retraction position can be housed in a space-saving manner. For example, even if the pseudo-cover 7 needs to be designed to have a large radius of rotation such that a lens focal point adjusting position of the pseudo-cover 7 is the same position as a position where the dome cover 4 is to be located, the pseudo-cover 7 rotated to the retraction position can be housed in a space-saving manner.

The material for the pseudo-cover 7 may be a smoked material. Use of a smoked material as the material for the pseudo-cover 7 makes it possible to adjust a focus position with an open iris (with a shallow depth of field) at the time of focusing. Since the focus position is adjusted with the shallow depth of field, the accuracy of adjustment of the focus position increases. Even if the quantity of light incident on an image sensor of a security camera decreases during nighttime or due to attachment of a light-shielding dome cover (e.g., a smoked dome cover), defocusing can be prevented. Note that even a case with such a reduced quantity of light is included in "optically equivalent" cases in the present invention.

Note that although the lock pins 12 are provided at the pseudo-cover 7, and the retraction position lock holes 14 are formed in the lens unit 5, the scope of the present invention is not limited to this. Lock holes may be formed in the pseudo-cover 7, and lock pins may be provided at the lens unit 5.

Although this embodiment is configured such that the pseudo-cover 7 is attached to the lens unit 5, the pseudo-cover 7 may be movably attached to an opening in an inner cover (not shown) which covers the lens unit 5 so as to conceal the internal structure of the camera from view while making a part of the lens unit 5 open.

Currently conceivable preferred embodiments of the present invention have been described above. However, it is understood that various modifications can be made to the embodiments and that the appended claims are intended to include all these modifications within the true spirit and scope of the present invention.

INDUSTRIAL APPLICABILITY

As described above, a dome camera according to the present invention has the advantage of being capable of improving the workability of lens focal point adjustment work with a simple and inexpensive configuration. This dome camera is useful as a security camera which is installed, e.g., on a wall or ceiling of a facility or building, or the like.

REFERENCE SIGNS LIST 1 dome camera
3 camera unit
4 dome cover
5 lens unit
7 pseudo-cover
8 retaining ring
9 support pieces
10 shaft pin
11 shaft hole
12 lock pin
13 adjusting position lock hole
14 retraction position lock hole

The invention claimed is:

1. A dome camera comprising: a lens unit which has an adjustable lens focal point; a dome cover which covers the lens unit; and a pseudo-cover which has optically equivalent characteristics to characteristics of the dome cover,
wherein the pseudo-cover is rotatable from a lens focal point adjusting position toward a retraction position, the lens focal point adjusting position being a position which is set on an optical axis of the lens unit, and the retraction position being a position which is back from the optical axis of the lens unit,
wherein the lens unit is provided at a camera unit which is tilt-rotatable, and
wherein the retraction position is set at each of a position where the pseudo-cover is located after the pseudo-cover is rotated from the optical axis of the lens unit toward one side along a tilt rotation direction of the camera unit and a position where the pseudo-cover is located after the pseudo-cover is rotated from the optical axis of the lens unit toward the other side.

2. The dome camera according to claim 1, wherein the pseudo-cover is attached to a distal end of the lens unit around a rotation axis which is set at the lens unit, and
the rotation axis is set at a position which is offset from a center of the dome cover toward the distal end of the lens unit.

3. The dome camera according to claim 1, wherein the pseudo-cover at the lens focal point adjusting position is located at the same position as a position where the dome cover is to be located or outside the position where the dome cover is to be located.

4. The dome camera according to claim 1, wherein the pseudo-cover, at the lens focal point adjusting position, is located inside a position where the dome cover is to be located, and
the pseudo-cover has a thickness set to be smaller than a thickness of the dome cover and a radius of curvature set to be smaller than a radius of curvature of the dome cover.

5. The dome camera according to claim 1, wherein the lens unit has a shaft hole formed at a position of the rotation axis, and
the pseudo-cover comprises a shaft pin which is inserted into the shaft hole and is rotatably supported on the lens unit via the shaft hole.

6. The dome camera according to claim 1, wherein the rotation axis is set on the optical axis of the lens unit.

7. A dome camera comprising: a lens unit which has an adjustable lens focal point; a dome cover which covers the lens unit; and a pseudo-cover which has optically equivalent characteristics to characteristics of the dome cover,
wherein the pseudo-cover is rotatable from a lens focal point adjusting position toward a retraction position, the lens focal point adjusting position being a position which is set on an optical axis of the lens unit, and the retraction position being a position which is back from the optical axis of the lens unit,
wherein a lock pin is provided at one of the pseudo-cover and the lens unit, and
wherein an adjusting position lock hole and a retraction position lock hole are formed in the other of the pseudo-cover and the lens unit, the adjusting position lock hole being engaged with the lock pin when the pseudo-cover is set at the lens focal point adjusting position, and the retraction position lock hole being engaged with the lock pin engages when the pseudo-cover is set at the retraction position.

8. A dome camera comprising: a lens unit which has an adjustable lens focal point; a dome cover which covers the lens unit; and a pseudo-cover which has optically equivalent characteristics to characteristics of the dome cover,
wherein the pseudo-cover is rotatable from a lens focal point adjusting position toward a retraction position, the lens focal point adjusting position being a position which is set on an optical axis of the lens unit, and the retraction position being a position which is back from the optical axis of the lens unit,
wherein the lens unit is provided at a camera unit which is tilt-rotatable,
wherein the rotation axis is set at a position which is offset from the optical axis of the lens unit toward one side on a tilt rotation plane of the camera unit, and
wherein the retraction position is set at a position where the pseudo-cover is located after the pseudo-cover is rotated from the optical axis of the lens unit toward a side opposite to the one side along a tilt rotation direction of the camera unit.

* * * * *